United States Patent [19]
Takahashi et al.

[11] Patent Number: 5,861,620
[45] Date of Patent: Jan. 19, 1999

[54] PHOTOELECTRIC CONVERTING APPARATUS

[75] Inventors: Hidekazu Takahashi, Isehara; Mahito Shinohara, Tokyo, both of Japan

[73] Assignee: Canon Kabushiki Kaisha, Tokyo, Japan

[21] Appl. No.: 783,362

[22] Filed: Jan. 16, 1997

[30] Foreign Application Priority Data

Jan. 19, 1996 [JP] Japan ................................. 8-007329

[51] Int. Cl.$^6$ ........................... H04N 5/335; H01L 27/00
[52] U.S. Cl. ....................... 250/208.1; 257/231; 348/308
[58] Field of Search ..................... 250/208.1; 257/231; 348/308, 311, 320–324

[56] References Cited

U.S. PATENT DOCUMENTS

| | | | |
|---|---|---|---|
| 5,182,623 | 1/1993 | Hynecek ................................. | 257/230 |
| 5,311,320 | 5/1994 | Hashimoto ............................. | 348/243 |
| 5,652,622 | 7/1997 | Hynecek ................................. | 348/311 |
| 5,693,932 | 12/1997 | Ueno et al. ........................... | 250/208.1 |
| 5,737,016 | 4/1998 | Ohzu et al. ............................. | 348/241 |

*Primary Examiner*—Stephone B. Allen
*Attorney, Agent, or Firm*—Fitzpatrick, Cella, Harper & Scinto

[57] ABSTRACT

In a CMOS area sensor, in order to enable an image signal of only a portion in the area to be read out on a block unit basis, there is provided a photoelectric converting apparatus of an amplifying type having two-dimensional sensor pixels, a transfer circuit for transferring pixel signals of the sensor pixels, and two-dimensional memory pixels for recording the transferred pixel signals, wherein two switches for writing or resetting are provided for at least ones of the sensor pixels and the memory pixels, one of the switches is controlled by a vertical selection circuit, and the other switch is controlled by a horizontal selection circuit. There is also provided a photoelectric converting apparatus having line sensor pixels, a transfer circuit for transferring pixels of the line sensor, and memory pixels of at least the same number as that of the line sensor pixels for recording an output of the transfer circuit, wherein switches for writing or resetting are provided for at least ones of the line sensor pixels and the memory pixels and are controlled by a selection circuit for selecting a predetermined number of pixels.

5 Claims, 5 Drawing Sheets

PHOTOELECTRIC CONVERTING APPARATUS

BACKGROUND OF THE INVENTION

1. Field of the Invention

The invention relates to a photoelectric converting apparatus and a semiconductor integrated device and, more particularly, to a photoelectric converting apparatus and a semiconductor integrated device, in which memory pixels of the same number as that of CMOS type line sensors and area sensors are provided and can be treated on at least a block unit basis.

2. Related Background Art

As photoelectric converting devices, there are generally a CCD type and an MOS type. In case of the CCD type, photoelectric converted charges which were read are sequentially transferred and are used as image signals. In case of the MOS type, photoelectric converted charges are accumulated in a gate of an MOS transistor and a potential change is charge amplified and outputted to the outside at a scanning timing. In the latter MOS type photoelectric converting apparatus, an area sensor in which a plurality of photoelectric converting elements are arranged in the lateral and vertical directions is often used. In the area sensor, the photoelectric converting elements are two-dimensionally arranged, photoelectric converting pixels are accumulated every line and transferred to an accumulating capacitor, charge signals accumulated in the accumulating capacitor are time-sequentially read out by a timing signal from a horizontal scanning register, and the reading operation of one line is finished. Residual charges in the accumulating capacitor are reset and the reading operation of next one line is started.

On the other hand, there is a photoelectric converting apparatus as an example in which memory pixels corresponding to an area sensor are provided for the area sensor. For example, the photoelectric converting elements and memory pixels of the same number as that of the photoelectric converting elements are provided and are integratedly formed by a CMOS process compatibility and such a sensor is hereinafter referred to as a CMOS type area sensor. As for the reading operation of the image signal in the CMOS type area sensor, first, the pixel signals of one line are read out from the photoelectric converting elements with a two-dimensional construction, the pixel signals are accumulated into the memory pixels of corresponding one line through a transfer circuit. The operations to sequentially read out the pixel signals every line, transfer, and accumulate into the memory are repeated. After completion of the reading of the pixel signals of one frame, the memory pixels are time-sequentially read out every line and a series of image signals can be derived. The memory pixels can be read out in order to again obtain the same image signal. The same image signal can be obtained many times as a nondestructive memory.

However, according to the CMOS area sensor, since the image signals are detected every line and the image signals are outputted every line, the image signal of only a portion of the area sensor cannot be obtained. When the image of such a portion is necessary, for example, there is a case where a line of sight is detected at the time of a focal control of a camera and it is necessary to focus to a point where the line of sight is directed. In such a case, in order to detect a focal error of a portion of the area sensor where the line of sight is directed, it is necessary to obtain the image signal of such a portion of the area sensor. In this case, the CMOS area sensor with the above construction cannot cope with such a purpose.

Even in case of a photoelectric converting apparatus arranged in a line, since the image detection of only a portion on one line cannot be performed, for example, in case of a copying apparatus in which a copy of only a portion is requested, it is necessary to read out the whole portion of one line. Useless operations are, consequently, executed.

It is, therefore, a subject of the invention to make it possible to read out an image signal of only a portion of a line or in an area in such a CMOS line sensor or CMOS area sensor as mentioned above.

SUMMARY OF THE INVENTION

The invention is made to solve the above subject and it is an object to provide an amplifying type photoelectric converting apparatus comprising: two-dimensional sensor pixels; a transfer circuit to transfer pixel signals of the sensor pixels; and two-dimensional memory pixels to record the transferred pixel signals, wherein two switches for writing or resetting are provided for at least ones of the sensor pixels and the memory pixels, one of the switches is controlled by a vertical selection circuit, and the other is controlled by a horizontal selection circuit.

The invention is not limited to a two-dimensional area sensor. In case of a one-dimensional line sensor, there is provided a photoelectric converting apparatus comprising: line sensor pixels; a transfer circuit to transfer pixels of the line sensor; and memory pixels of at least the same number as that of the line sensor pixels to record an output of the transfer circuit, wherein switches for writing or resetting are provided for at least ones of the line sensor pixels and the memory pixels and are controlled by a selection circuit of predetermined pixels.

The above and other objects and features of the present invention will become apparent from the following detailed description and the appended claims with reference to the accompanying drawings.

DETAILED DESCRIPTION OF THE PREFERRED EMBODIMENTS

Figure 1:
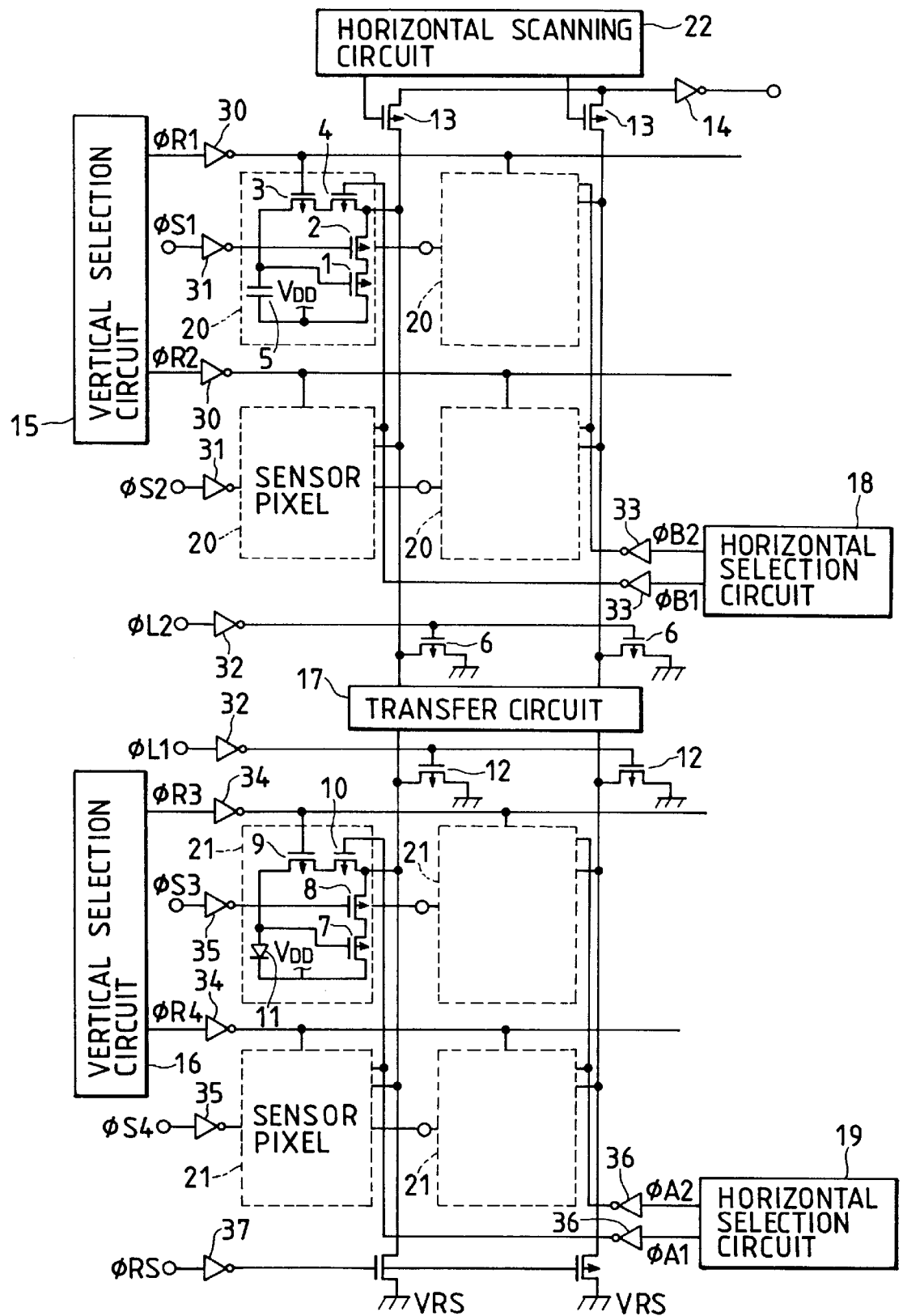
FIG. 1 is a circuit diagram of a semiconductor converting apparatus and a semiconductor integrated circuit according to the invention.

FIG. 1 is a circuit diagram of a photoelectric converting apparatus of (2×2) pixels and memory pixels according to the first embodiment of the invention. In the diagram, reference numeral 1 denotes an amplifying MOS transistor of an inverting amplifier; 2 an MOS transistor for switching which is turned on by a switching pulse φS1; 3 a first writing MOS transistor which is controlled by a write pulse φR1 from a vertical selection circuit 15; 4 a second writing MOS transistor which is controlled by a horizontal selection circuit 18; and 5 a capacitor for accumulating charges. The above component elements construct one memory pixel 20.

Reference numeral 6 denotes a load MOS transistor of the inverting amplifying MOS transistor 1. The load MOS transistor 6 constructs an inverting amplifier in combination with the inverting amplifying MOS transistor 1.

Reference numeral 7 denotes an amplifying MOS transistor of an inverting amplifier; 8 an MOS transistor for switching which is turned on by a switching pulse $\phi S3$; 9 a first resetting MOS transistor which is controlled by the write pulse $\phi R3$ from a vertical selection circuit 16; 10 a second resetting MOS transistor which is controlled by a horizontal selection circuit 19; and 11 a photodiode. The above component elements construct one sensor pixel 21. Reference numeral 12 denotes a load MOS transistor of the inverting amplifying MOS transistor 7. The load MOS transistor 12 constructs an inverting amplifier in combination with the inverting amplifying MOS transistor 7. Reference numeral 13 denotes a horizontal switching MOS transistor for outputting a pixel signal in the charge accumulating capacitor 5 of the memory pixel 20 to an output amplifier 14 on the basis of a horizontal scanning timing signal from a horizontal scanning circuit 22. Reference numerals 30 to 37 denote inverters. Polarities of the MOS transistors are not limited to those polarities but can be also preferably selected.

The embodiment is characterized by providing the writing MOS transistor and resetting MOS transistor which are controlled by the horizontal selection circuits 18 and 19.

In FIG. 1, in the CMOS area sensor, an object is read by the photodiode 11 of the sensor pixel 21. The image signal of the sensor pixel 21 is transferred by a transfer circuit 17 every line or every horizontal line of a block according to the control of the horizontal selection circuit 19. The image signal is accumulated into the charge accumulating capacitor 5 of the sensor pixel 20 every horizontal line or every horizontal line of a block according to the control of the horizontal selection circuit 18. After that, in accordance with a timing signal from the horizontal scanning circuit 22, the horizontal switching MOS transistor 13 is made conductive every block according to the control of the horizontal selection circuit 18. An image signal is outputted or an image signal is outputted as an image signal of a predetermined block from the output amplifier 14.

In each sensor pixel 21, first, a reset pulse $\phi R3$ from the vertical selection circuit 16 is set to the high level. A horizontal selection pulse from the horizontal selection circuit 19 is set to the high level in accordance with a block selected by a predetermined instruction. Residual charges of the photodiode 11 are reset to the ground level by turning on the first and second resetting MOS transistors 9 and 10, setting a load pulse $\phi L1$ to the high level, and making the load MOS transistor 12 conductive. After that, the photodiode 11 is exposed by the object for a predetermined time. After the elapse of the predetermined time, the load pulse $\phi L1$ is set to the high level, the load MOS transistor 6 is made conductive, the switching pulse $\phi S3$ is set to the high level, the image charges of the photodiode 11 are amplified by the amplifying MOS transistor 7, the switching MOS transistor 8 is made conductive, and the image charges are transferred to a memory pixel portion by the switching MOS transistor of the transfer circuit 17.

Figure 2:
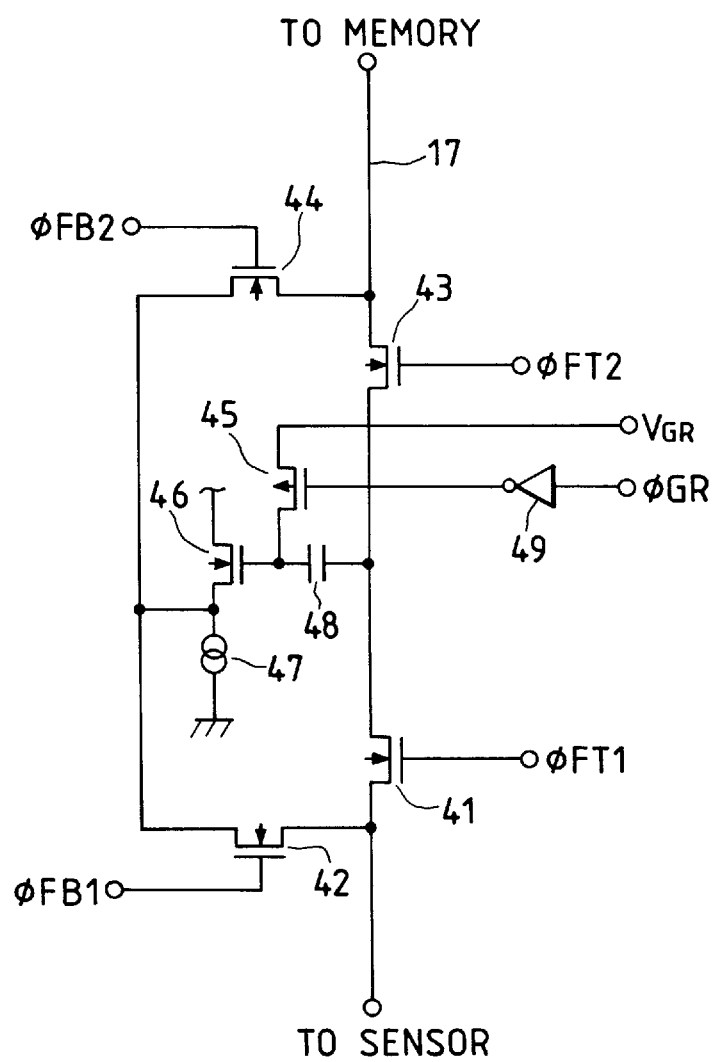
FIG. 2 is a circuit diagram of a transfer circuit of the photoelectric converting apparatus and semiconductor integrated circuit according to the invention.

A specific example of the transfer circuit 17 will now be described with reference to FIG. 2. In FIG. 2, reference numeral 41 denotes a transfer MOS transistor to transfer the signal from the CMOS sensor pixel 21; 42 an MOS transistor to feed back the signal to the sensor pixel 21; 43 an MOS transistor to transfer the signal from the memory pixel 20; 44 an MOS transistor to feed back the signal to the memory pixel 20; 45 an MOS transistor to reset a clamping capacitor 48; 46 an amplifying MOS transistor of a source-follower circuit; and 47 a constant current source.

In each memory pixel 20, the write pulse $\phi R1$ from the vertical selection circuit 15 is set to the high level and the horizontal selection pulse from the horizontal selection circuit 18 is set to the high level in accordance with a block selected by a predetermined instruction. Residual charges in the accumulating capacitor 5 are reset to the ground level by turning on the first and second writing MOS transistors 9 and 10, setting a load pulse $\phi L2$ to the high level, and making the load MOS transistor 6 conductive. Subsequently, the image signal of the sensor pixel from the transfer circuit 17 is accumulated into the accumulating capacitor 5 by setting the write pulse $\phi R1$ from the vertical selection circuit 15 to the high level, setting a horizontal selection pulse $\phi B1$ from the horizontal selection circuit 18 to the high level in accordance with a block selected by a predetermined instruction, turning on the first and second writing MOS transistors 3 and 4, and setting the load pulse $\phi L2$ to the high level. Subsequently, the transfer MOS transistor 13 is turned on by a timing signal from the horizontal scanning circuit 22. The load pulse $\phi L2$ is set to the high level. The charge voltage accumulated in the accumulating capacitor is amplified by the amplifying MOS transistor 1. The switching MOS transistor 2 is made conductive. An image signal is outputted or an image signal is outputted as an image signal of a predetermined block from the output amplifier 14 through the transfer MOS transistor 13.

Figure 3:
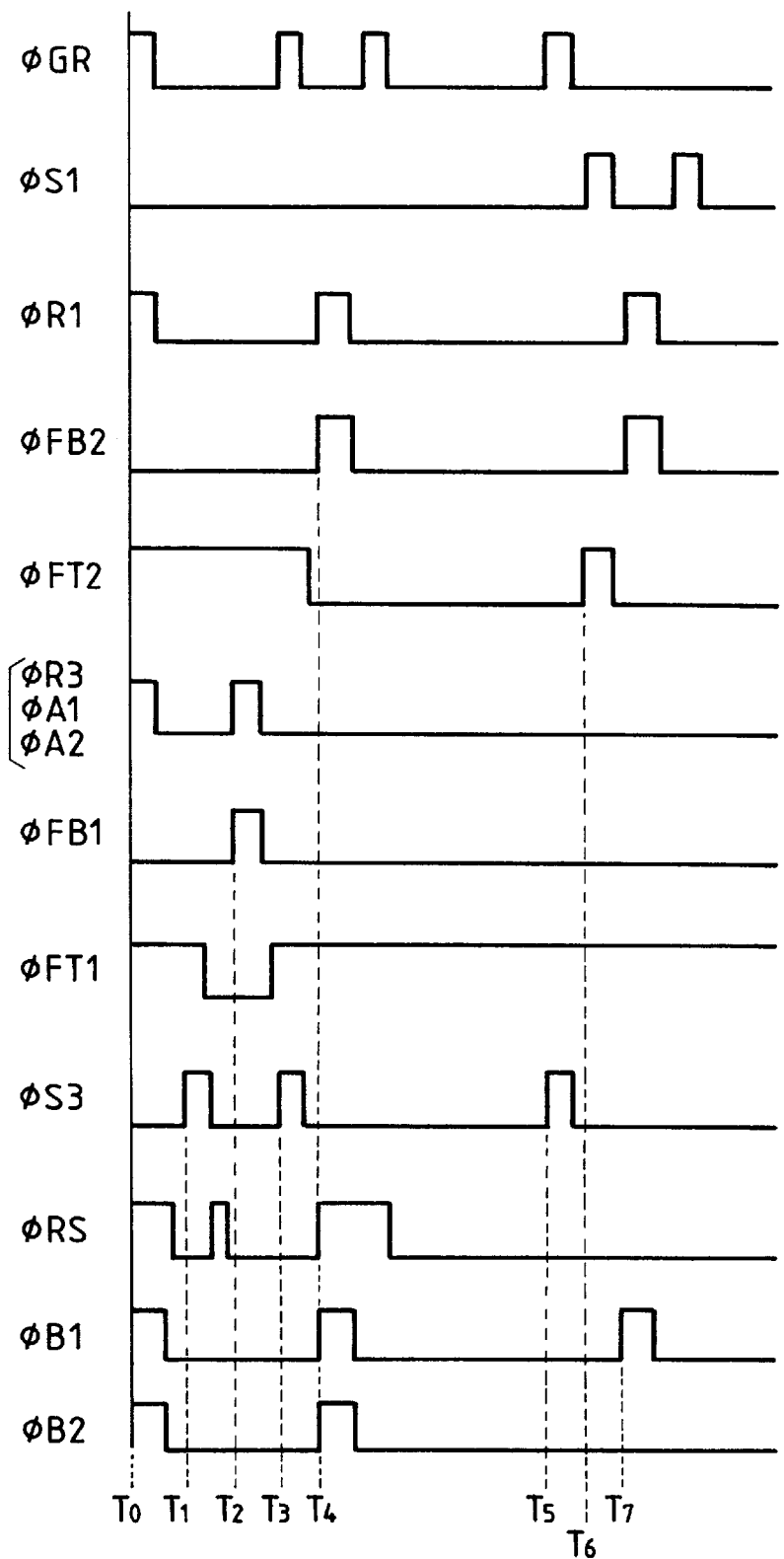
FIG. 3 is a timing chart showing the operation of the photoelectric converting apparatus and semiconductor integrated circuit according to the invention.

FIG. 3 shows a timing chart for a further detailed driving method of the embodiment 1. FIG. 3 shows an example of a random writing operation into the memory pixels.

At time T0, control pulses $\phi RS$, $\phi B1$, $\phi B2$, $\phi A1$, $\phi A2$, and $\phi R1$ to $\phi R4$ are set to the high level and the sensor pixel 21, memory pixel 20, and transfer circuit 17 are reset. At time T1, the pulse $\phi S3$ is set to the high level and the signal of the sensor pixel 21 is sent to the transfer circuit 17.

At time T2, the pulses $\phi R3$, $\phi A1$, and $\phi A2$ are set to the high level and the signal (corresponding to noise components here) from the transfer circuit 17 is fed back to the sensor pixel 21. The noise components of the sensor pixel 21 and the noise components which were fed back are cancelled here.

At time T3, the signal is again sent from the sensor pixel 21 to the transfer circuit 17 and is clamped. At time T4, the pulses $\phi R1$, $\phi B1$, and $\phi B2$ of the memory pixel 20 are set to the high level and initial signals from the sensor pixel 21 and transfer circuit 17 are written.

The above operations are executed with respect to all of the lines, thereby completing the resetting operation. Subsequently, after the elapse of an arbitrary accumulation time, the signal is read out from the sensor pixel 21 and its value is written into the memory pixel.

At time T5, $\phi S3$ is set to the high level and the signal of the sensor pixel 21 is read out. At time T6, $\phi S1$ is set to the high level and the signal in the initial state is read out from the memory pixel 20, thereby obtaining a difference signal between the read-out signal and the signal of the sensor pixel 21. At time T7, the photosignal corresponding to the difference between the signal of the sensor pixel 21 and the initial signal is written into the memory pixel 20. Upon writing, the pulse is generated from the horizontal selection circuit, thereby allowing the signal to be written into an arbitrary memory. In FIG. 3, $\phi B1$ is set to the high level and $\phi B2$ is set to the low level, thereby setting a timing to write the signal into only the memory pixel 20 connecting to $\phi B1$.

In the embodiment, although the reset pulses φR3 and φR4 of the sensor pixel 21 have been synchronized with φA1 and φA2 of the horizontal selection circuit 19 and all of the lines have been reset. However, it will be obviously understood that either one of φA1 and φA2 is selected and only an arbitrary pixel can be reset. Although an example in which the memory pixel connected to each control line of the horizontal selection circuit is treated as a block has been shown and described, by providing such a control line for every memory pixel, it is also possible to make the memory pixels different as a plurality of arbitrary blocks every target image in accordance with control pulses to the control lines. If the blocks are fixedly set, the control line can be also commonly connected to the blocks in a hardware manner.

An example in which the memory pixels 20 are divided into blocks by the horizontal selection circuit 18 has been shown and described above. However, by the operation similar to the above, it is also possible to construct as follows. Only the blocks of a predetermined region instructed by the horizontal selection circuit 19 are selected, only predetermined photodiodes are exposed for only a predetermined time and image signals are read out and transferred. In the horizontal selection circuit 18, when the residual charges in the accumulating capacitor 5 are reset, all of the memory pixels 20 are reset. The writing MOS transistor 4 for writing into the accumulating capacitor 5 is turned on with respect to only the relevant blocks for the transferred image signal, thereby enabling the signal to be written into the accumulating capacitor 5 of a predetermined block. The written accumulated charges can be read out as a nondestructive memory many times in accordance with the scan of the horizontal scanning circuit 22. As for the sensor pixel 21, an exposure start time is arbitrarily set and controlled, a charge amount of each photodiode 11 is set to a level at which the charges are not saturated, and a blooming can be prevented. As mentioned above, the image of only a specific block is detected and, for example, as a sight line sensor, an automatic focusing of a camera can be accomplished in accordance with the sight line direction.

In the embodiment, it will be obviously understood that all of the outputs of the horizontal selection circuits 18 and 19 are turned on and can be read out every ordinary line.

Although an example in which the block control in the inverting amplifying type CMOS sensor is enabled has been shown and described in the above embodiment, so long as the sensor is a line or area sensor, the invention can be applied to any of the CCD type sensor and the MOS type sensor.

Figure 4:
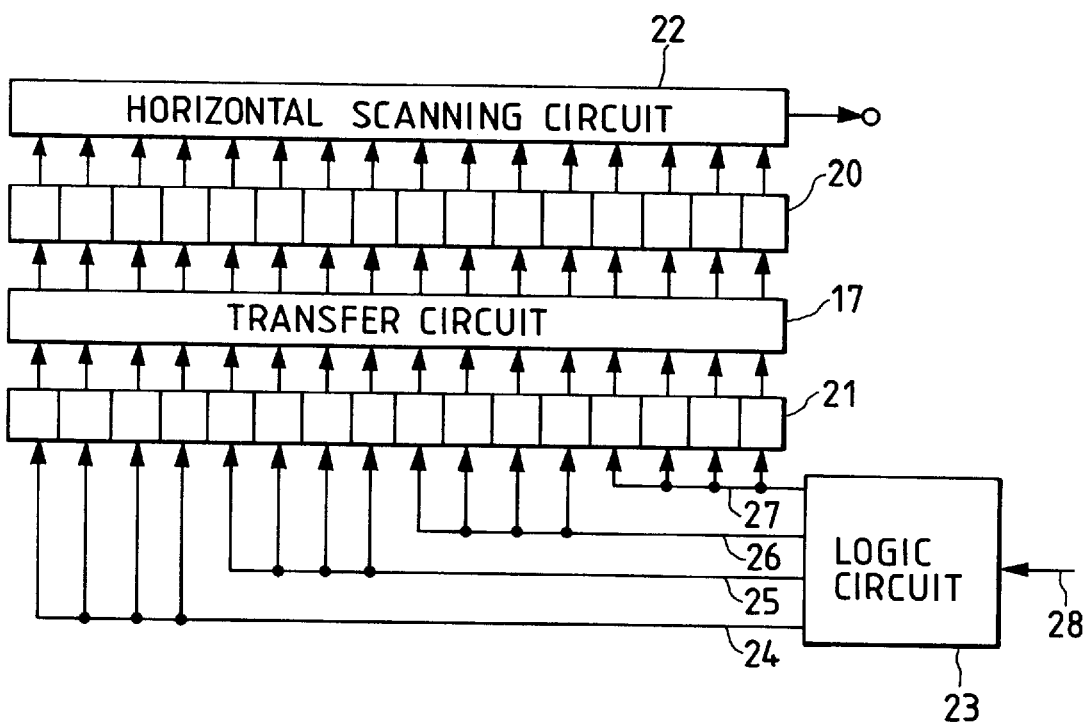
FIG. 4 is another circuit block diagram of the photoelectric converting apparatus according to the invention.

FIG. 4 shows a block diagram of a block control of a line sensor according to the second embodiment. In FIG. 4, reference numeral 21 denotes the sensor pixels arranged in a line and an internal circuit is similar to the circuit including the photodiodes shown in FIG. 1. Reference numeral 17 denotes a transfer circuit; 20 the memory pixel corresponding to the sensor pixel 21; 22 the horizontal scanning circuit for reading out the accumulated charges of the memory pixel 20; and 23 a logic circuit to read out the image every block of the sensor pixel 21.

In FIG. 4, by an instruction signal 28 from the outside, an instruction control signal is inputted for all blocks or every other block or every two other blocks. In accordance with the instruction control signal, the logic circuit 23 sets all of output instruction control signals 24 to 27 to the high level or sets a combination of only the output instruction signals 24 and 26, only the output instruction signals 24 and 27, or the like. Only predetermined blocks of each sensor pixel 21 are turned on, thereby reading out the image signals. The read-out image signals are transferred in a lump by the transfer circuit 17 comprising a switching MOS transistor or the like and are written into the memory pixel 20. The written image signals are sequentially outputted by the timing signal of the horizontal scanning circuit 22. In this case, since not only the image signal of the designated block but also dark portion signals of the blocks which are not designated are outputted, there is a portion without a signal in the image signal. Therefore, in response to the timing signal of the horizontal scanning circuit, only the necessary image signal can be also outputted by an instruction from the logic circuit 23 to the horizontal scanning circuit 22. In this manner, the block reading operation in the sensor pixel 21 of the line sensor is enabled. As the block is larger, a wiring from the logic circuit 23 is more simplified. If the logic circuit 23 and all of the sensor pixels 21 are wired, a size of block can be arbitrarily and freely set in accordance with an instruction input.

Figure 5:
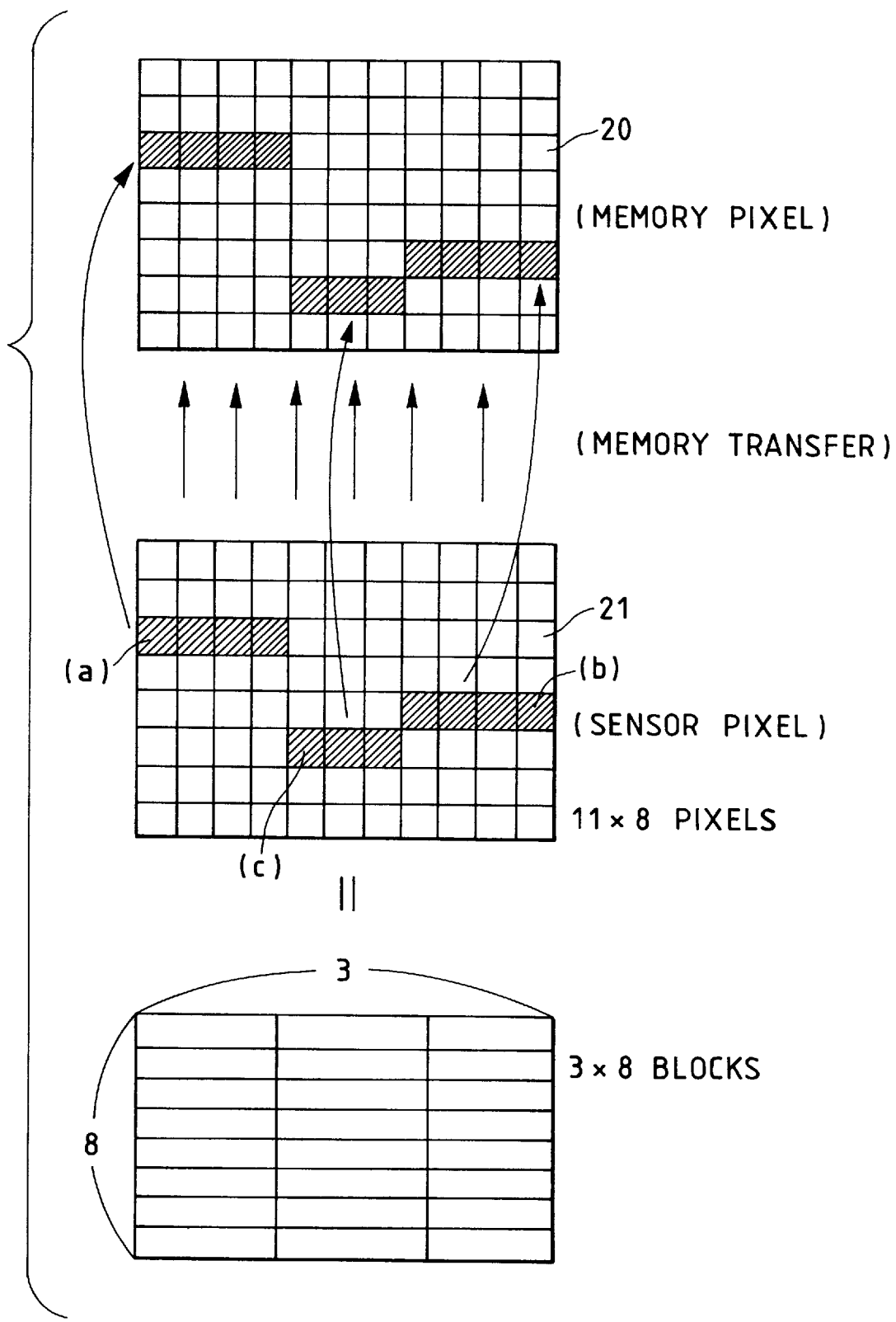
FIG. 5 is a block diagram of another embodiment according to the invention.

FIG. 5 is a conceptual diagram for explaining a transfer method from the sensor pixel to the memory pixel in an area sensor according to the third embodiment of the invention. Hatched portions in the sensor pixel 21 are accumulated in hatched portions in the memory pixel 20 through the transfer circuit. As for the image signals which were once accumulated, the same signal can be read out many times as a nonvolatile memory until they are reset. When such an area sensor is used as, for example, an AF sensor for a camera according to the sight line direction, the inside of the area sensor is divided into 24 (=3×8) blocks, to which block the line of sight corresponds is specified in accordance with the direction of the sight line, the image of such a specified block is read out, the image of the specified block is read out every position of the camera lens, an optimum focusing position is discriminated, an AF is performed, and an object is photographed at a predetermined speed by opening a shutter in such a state. Upon photographing, the image signals are read out from all of the sensor pixels and the video signal according to the line of sight can be outputted.

In the diagram, a concept of reading out each of blocks (a) to (c) is shown. After the blocks (a) to (c) were read out and transferred, an exposure is further performed and the remaining blocks are transferred to the memory.

In the embodiments, an example in which the sensor pixels of the line or area sensor are controlled on a block unit basis, an example in which the nondestructive memory pixels corresponding to the sensor pixels are controlled on a block unit basis, and an example of a compound type of them have been shown and described. However, they can be applied to various purposes such as AF control of the camera, sight line detection, and the like. The invention is not limited to the application examples.

According to the photoelectric converting apparatus and semiconductor integrated circuit of the invention as described above, the block control of the CMOS sensor is enabled, the reading operation of the random access of the sensor pixels is enabled, the random access writing operation of the memory pixels is enabled, and the same image signal can be obtained a plurality of number of times by the nonvolatile memory pixel.

Many widely different embodiments of the present invention may be constructed without departing from the spirit and scope of the present invention. It should be understood that the present invention is not limited to the specific embodiments described in the specification, except as defined in the appended claims.

What is claimed is:

1. A photoelectric converting apparatus of an amplifying type comprising: two-dimensional sensor pixels; a transfer circuit for transferring pixel signals of said sensor pixels; and two-dimensional memory pixels for recording said transferred pixel signals, wherein two switches for resetting or writing are provided for at least one of said sensor pixels and said memory pixels, one of said switches is controlled by a vertical selection circuit, and the other switch is controlled by a horizontal selection circuit.

2. A photoelectric converting apparatus comprising: line sensor pixels; a transfer circuit for transferring pixel signals of said line sensor; and memory pixels of at least the same number as that of said line sensor pixels for recording an output of said transfer circuit, wherein switches for resetting or writing are provided for at least one of said line sensor pixels and said memory pixels and are controlled by a selection circuit for selecting a predetermined number of pixels.

3. A photoelectric converting apparatus comprising: a plurality of pixels for a line sensor; and memory pixels for respectively recording outputs of said pixels for the line sensor, wherein switches for resetting or writing are provided for at least one of said pixels for the line sensor and said memory pixels and are controlled by a selection circuit for selecting a predetermined number of pixels among said plurality of pixels.

4. A semiconductor integrated device in which two-dimensional sensor pixels, a transfer circuit for transferring pixel signals of said sensor pixels, and two-dimensional memory pixels for recording said transferred pixel signals are formed by an MOS process, wherein two switches for resetting or writing are provided for at least one of said sensor pixels and said memory pixels, one of said switches is controlled by a vertical selection circuit, and the other switch is controlled by a horizontal selection circuit.

5. A semiconductor integrated device comprising: a plurality of pixels for a line sensor; and memory pixels of at least the same number as that of said pixels for the line sensor for recording outputs of said plurality of pixels for the line sensor, wherein switches for resetting or writing are provided for at least one of said plurality of pixels for the line sensor and said memory pixels and are controlled by a selection circuit for selecting a predetermined number of pixels among said plurality of pixels.

* * * * *

UNITED STATES PATENT AND TRADEMARK OFFICE
CERTIFICATE OF CORRECTION

PATENT NO. : 5,861,620

DATED : January 19, 1999

INVENTOR(S) : HIDEKAZU TAKAHASHI ET AL.

It is certified that error appears in the above-identified patent and that said Letters Patent is hereby corrected as shown below:

COLUMN 1

Line 18, "transistor" should read --transistor,--.
    Line 19, "charge amplified" should read
--charge-amplified--.
    Line 28, "operation" should be deleted.
    Line 30, "reset" should read --reset,--; and
"next one" should read --the next--.
    Line 46, "transfer," should read --transfer them,--.
    Line 47, "late" should read --late them--.
    Line 49, "line" should read --line,--.
    Line 57, "the" should read --an--.
    Line 66, "cope with such a" should read --fulfil the--.
    Line 67, "purpose." should read --purpose at hand.--.

COLUMN 2

Line 1, "case" should read --the case--.
    Line 3, "case" should read --the case--.
    Line 7, "a subject" should read --an object--.
    Line 13, "subject and it is" should read --object and, in
one aspect,--.
    Line 14, "an object to provide" should read --provides--.
    Line 24, "case" should read --the case--.
    Line 67, "construct" should read --constitute--.

UNITED STATES PATENT AND TRADEMARK OFFICE
CERTIFICATE OF CORRECTION

PATENT NO. : 5,861,620
DATED      : January 19, 1999
INVENTOR(S): HIDEKAZU TAKAHASHI ET AL.

It is certified that error appears in the above-identified patent and that said Letters Patent is hereby corrected as shown below:

COLUMN 3

Line 25, "providing" should be deleted.

COLUMN 5

Line 1, "although" should be deleted.

COLUMN 5

Line 62, "two other blocks." should read --third block.--.

Signed and Sealed this

Twenty-third Day of November, 1999

Attest:

Q. TODD DICKINSON

*Attesting Officer*   *Acting Commissioner of Patents and Trademarks*